INVENTOR
ANDRE T. ABROMAITIS
BY
*George H. Fritzinger*
AGENT

3,525,907
FAIL-SAFE SYSTEM
Andre T. Abromaitis, Morris Township, Morris County, N.J., assignor to McGraw-Edison Company, Elgin, Ill., a corporation of Delaware
Filed Jan. 10, 1968, Ser. No. 696,842
Int. Cl. H01h 47/24
U.S. Cl. 317—124                                     7 Claims

ABSTRACT OF THE DISCLOSURE

A flame safeguard system is provided which will fail-safe if any defect develops in the system. It has a voltage regulator comprising an input filter which is resonated with the primary winding of an input power transformer having a core of square loop magnetic material saturated by the resonate current. An ultraviolet detector tube operated through a half-wave rectifier is coupled through a gate-controlled rectifier and sensitivity-control resistor to feed pulsating direct current to operate a first control relay when the ultraviolet tube is fired and the circuit is operating properly. A second control relay is coupled to the power supply through a full-wave rectifier and in parallel with the gate-controlled rectifier and sensitivity-control resistor to cause the second relay to be operated when the sensitivity-control resistor and gate-controlled rectifier are functioning properly. A utilization circuit is rendered operative only when the first and second control relays are operated.

---

Objects of the invention are to provide an improved flame safeguard system which will fail safe (1) if there is any failure in the voltage regulator of the power supply for the system (2) there is any electronic component failure in the system, and (3) the UV detector tube should fire or "lock-on" in the absence of ultraviolet radiation.

These and other objects and features of the invention will be apparent from the following description and the appended claims.

Figure 1:
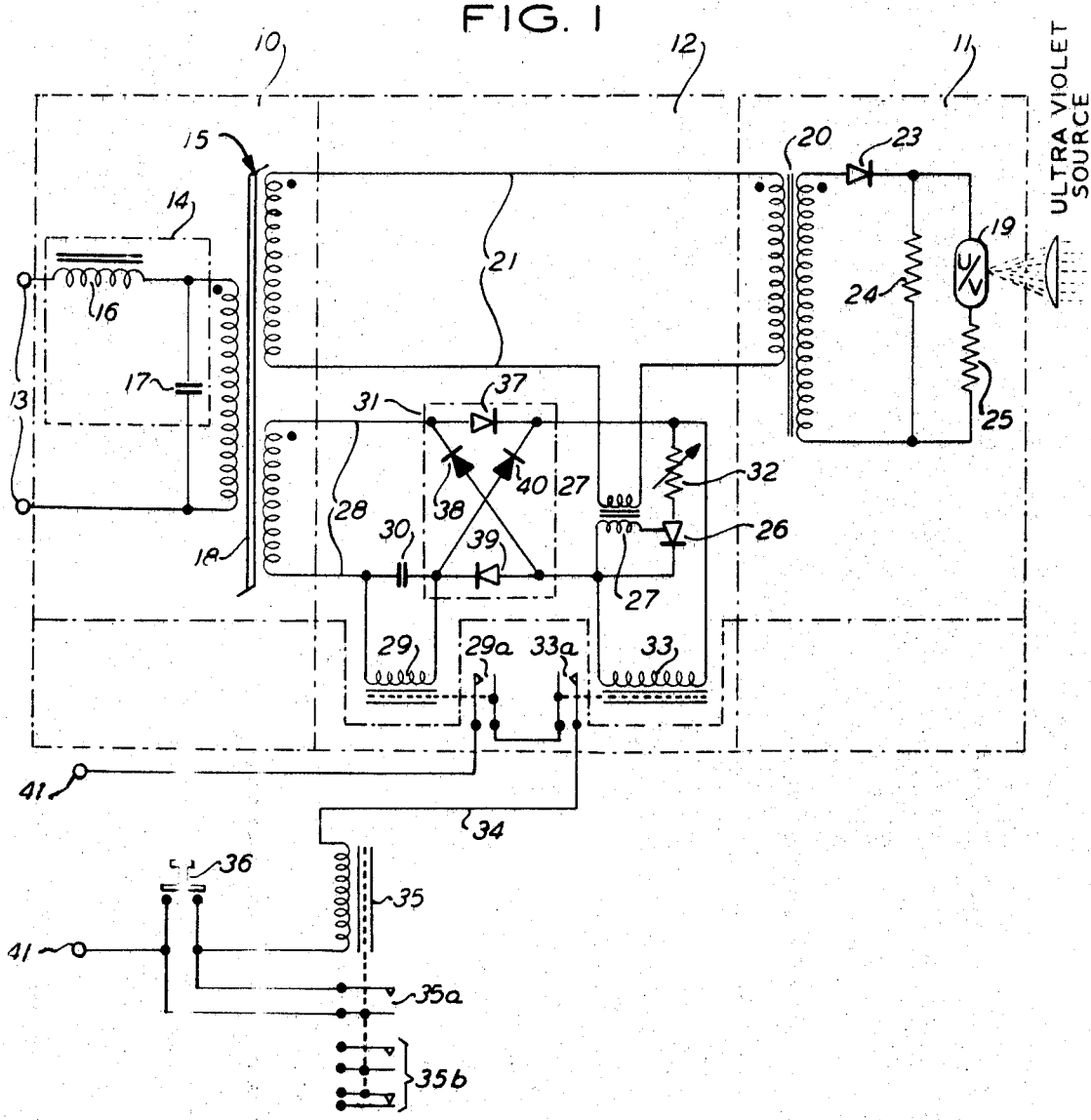
Figure 2:
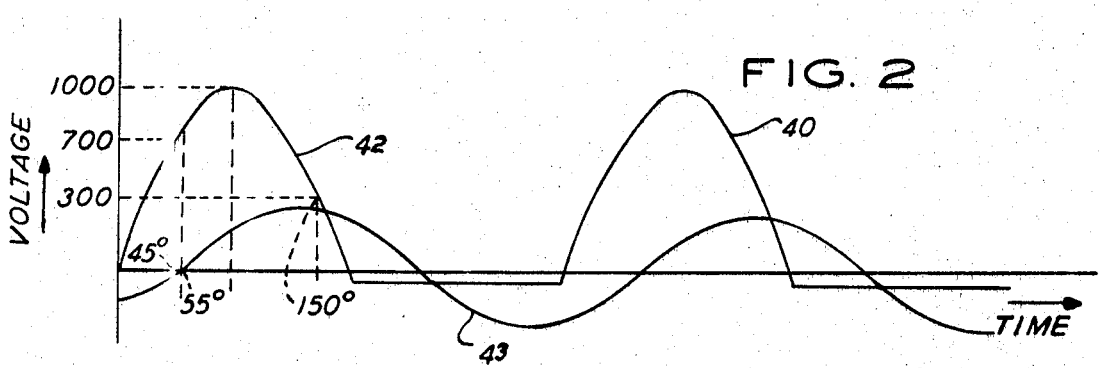

In a description of my invention reference is had to the accompanying drawings, of which:

FIG. 1 is a schematic diagram of a flame safeguard system according to my invention; and FIG. 2 is a graph showing the applied voltage across the UV detector tube and the signal voltage in the detector circuit.

For simplicity of description the schematic circuit diagram of FIG. 1 may be considered as comprising the following sections indicated by dash-dot lines: a voltage regulator 10, an ultraviolet scanner 11 and an electronic signal detector 12.

The voltage regulator 10 is connected via terminals 13 to an A.C. power source which may typically be a 60 c.p.s. power line of nominally 120 volts. The input terminals 13 are connected via a filter 14 to the primary winding of a power transformer 15. The filter 14, which is provided among other purposes to suppress transients, comprises a series inductance 16 and a shunt capacitor 17. These filter components resonate with the primary winding of the transformer 15 near the power line frequency. The transformer has a core 18 of square loop magnetic material which saturates at a voltage of the order of 330 volts R.M.S. The near resonant condition is maintained through a range of the voltage of the A.C. power source from 90 to about 140 volts, and provides a voltage across the primary winding of the order of 330 volts R.M.S. throughout this range. Advantages of this filter-regulator are that transient suppression and voltage regulation are achieved by the same components, and that a failure of any component which places the regulator in a non-resonant condition will result in such a large drop in the output voltage as to shut down the system.

The UV scanner comprises a UV detector tube 19 preferably of the type described in the Howling Pat. No. 3,047,761, issued July 31, 1962. Such detector tube will fire whenever the applied voltage is in excess of the starting voltage of around 700 volts and the tube is exposed to ultraviolet radiation. The tube 19 is connected to the secondary winding of a voltage step-up transformer 20, the primary winding of which is connected in a loop 21 with a secondary winding of the power transformer 15. The transformer ratios are such that a supply voltage of 700 volts R.M.S. (1000 volts peak) is supplied to the tube 19. However, in the present system it is desired that the UV tube be able to conduct when exposed to UV only during each alternate half cycle of the power supply, and therefore a single-wave rectifier 23 is connected in series with the tube. Since the impedance of the UV tube 19 is higher before it breaks down than the reverse impedance of the rectifier 23, a shunt resistor 24 is connected across the tube 19 to prevent possible firing of the tube during the negative half cycles. A resistor 25 is connected in series with the tube 19 to prevent relaxation oscillation of the UV tube.

When a sinusoidal peak voltage of 1000 volts is supplied to the UV tube, the starting voltage of 700 volts is reached at about 45° after the A.C. supply voltage passes through zero (FIG. 2). Once the tube is fired, it remains conductive until the applied voltage falls to about 330 volts—which occurs at about 150° from zero. Thus, during each alternate half cycle of the power source the UV tube can be in a conducting state for a duration from about 45° to 150° in the one-half cycle of the power supply if a saturating level of UV radiation is present. If the radiation is below saturation at the instant the supply voltage is 45° from zero, the firing may be delayed or may not occur at all in the 45° to 135° range.

The instant the UV tube is fired a low impedance is reflected to the primary of the transformer 20 causing a sudden increase in current in the loop 21. This sudden increase in the loop current is detected in the signal detector section 12 by the triggering of a silicon-controlled rectifier 26 the gate of which is coupled through a pulse transformer 27 to the loop 21. The rectifier 26—which operates as an electronic switch—is connected in a second secondary circuit 28 of the power transformer 15. This second secondary circuit includes a flame control D.C. reed relay 29. Shunting this relay is a capacitor 30 to provide an approximate three second dropout time of the relay and make the relay 29 operable by half wave rectified current without chattering. In series with this relay is a full wave bridge type rectifier 31, the electronic switch 26 and a variable resistor 32 adjustable within a given range to set the sensitivity of the flame control relay 29. In shunt with the portion of the secondary circuit 28 including the secondary of the pulse transformer 27, the electronic switch 26 and resistor 32 is a D.C. reed relay 33 operable without chattering only by full wave rectified current. The two reed relays 29 and 33 have respective contacts 29a and 33a which are closed when the relays are operated. These contacts are connected serially in a utilization circuit 34 including an output relay 35 and a pushbutton type start switch 36. Shunting the start switch 36 is a pair of hold contacts 35a of the output relay. Other contacts 35b of the output relay are provided to control functional circuits not shown.

Since the UV detector tube 19 can conduct only during alternate half-cycles of the power supply due to the rectifier 23, the electronic switch 26 can likewise be triggered only during the corresponding half-cycles. The full-wave rectified 31 in the secondary circuit 28 includes rectifiers 37 and 39 conductive during the positive half-cycles provided the electronic switch 26 is then in a conductive state, and rectifiers 38 and 40 conductive during the negative half-cycles. The purpose of the full-wave rectifier is to feed alternating current through the flame relay 29 and capacitor 30—a condition in which the relay 29 will not operate—if the electronic switch 26 fails as a gate-controlled rectifier or becomes shorted or operates as a regular diode independently of any control from the UV detector tube. Also, the full-wave rectifier provides full wave rectified current to the reed relay 33. By requiring full wave rectified current to hold the relay 33 operated, it serves to monitor constantly for a rectifier failure as well as for a shorting of the sensitivity control resistor 32 since a shorting of this resistor would cut off power to the relay 33 during the alternate positive half-cycles when UV radiation is being detected (the electronic switch 26 is conductive) causing the relay 33 then to chatter. If the relay 33 should so chatter it would momentarily open the output circuit and drop out the output relay 35 to shut down the system.

When ultraviolet radiation is detected the electronic switch 26 is triggered into the conductive state during each positive half-cycle causing half-wave D.C. pulses of current to flow in the secondary circuit 28 via rectifier 37, resistor 32, electronic switch 26, rectifier 39, and integrating condenser 30 and relay 29 in parallel. The setting of the resistor 32 predetermines the UV radiation level at which the relay 29 is operated. So long as the UV radiation remains above this level and the circuit is functioning normally so that there is no reverse current flow to the relay 29 during the negative half-cycles the relay 29 is held operated. Also, if the system is functioning normally the relay 33 is held operated as before described. Thus, upon pressing the start switch 36 the output relay 35 is operated from a power source (not shown) connected to the terminals 41. When the start switch 36 is released the output relay is maintained in operated condition via its hold contacts 35a. This condition remains unless there is a loss of UV radiation causing a drop out of the relay 29 or there is a malfunction in the system causing a drop out or chattering of either the relay 29 or the relay 33.

A further system failure could occur if the UV tube 19 should lock-on—i.e., fire when a starting voltage is applied in the absence of UV radiation. This possibility has been prevented in the present invention by providing a circuit condition causing the voltage in the loop 21 to be at a 55° lagging phase angle relative to the voltage applied across the UV detector tube 19. This is shown in FIG. 2 wherein the alternate half-cycles of voltage 42 across the UV tube 19 are at a 55° leading phase angle relative to the voltage 43 in the loop circuit 21. Such leading phase angle is obtained by constructing the transformers 15 and 20 to rigid specifications to provide a right combination of winding resistances and of leakage inductances. A UV tube in a lock-on condition would fire the instant an applied voltage of 700 volts is reached—i.e., at 45° from zero as indicated in FIG. 2—and such firing pulse would trigger the electronic switch 26. However, since the voltage across the detector circuit is close to zero at that instant the electronic switch 26 is not triggered into conduction. If the electronic switch is not triggered the output control relay 29 becomes deenergized and remains so as long as the UV tube is in a lock-on condition. Thus, the utilization circuit cannot be activated by a lock-on tube. A firing of a normal UV tube shortly after the starting voltage is reached—i.e., after 55°—would however be effective to trigger the electronic switch 26.

The embodiment of my invention herein particularly shown and described is intended as being illustrative and not necessarily limitative of my invention, which I endeavor to express according to the following claims. In construing the claims the phrase that "the utilization means is rendered operative" is intended as comprehending the condition that the output relay 35 will be operated when the start switch 36 is closed.

I claim:
1. A fire detection system comprising an input transformer having a primary winding to be connected to an A.C. source of potential, a UV detector tube, a UV transformer having a secondary connected to said tube, an intermediate coupling circuit connecting the primary winding of said UV transformer to a secondary winding of said input transformer, a half-way rectifier connected in series with said UV detector tube to allow said detector tube to pass current pulses only during alternate half cycles of said A.C. source when said tube is subjected to ultraviolet radiation, a pulse detector means comprising a gate-controlled rectifier having the gate connected to said coupling circuit to render the rectifier conductive during the half-cycles of the supply voltage when said UV detector tube is conductive, a first control relay operable by half-wave rectified current and inoperable by alternating current, a full-wave rectifier, and an operating circuit coupled to said A.C. source and serially including said full-wave rectifier, said control relay connected to the input side of said full-wave rectifier and said gate controlled rectifier connected to the output side of said full-wave rectifier.

2. A fire detector system as set forth in claim 1 wherein said detector circuit includes a gate-controlled electronic switch rendered closed by pulses generated in said coupling circuit when said UV detector tube is fired, and wherein the circuit parameters in said coupling circuit are set to cause the current therein to lead the voltage across said UV detector tube by an amount causing the current in the coupling circuit to pass through zero substantially at the instant the voltage applied to the UV detector tube reaches a starting value whereby pulses in said coupling circuit fed to said detector circuit at the instant the applied voltage reaches a starting value are ineffective to trigger said electronic switch into a closed condition.

3. The fire detector system set forth in claim 2 including a resistor element in series with said gate-controlled rectifier at the output side of said full-wave rectifier, and a second control relay operable only by full-wave rectified current, said second control relay being connected in parallel with said gate-controlled rectifier and said resistor element.

4. The fire detector system set forth in claim 3 including an integrating condenser across said first relay, said resistance element being adjustable within a normal range to set the charge supply to said integrating condenser during each half-cycle of the input voltage when said UV detector tube is conductive, and wherein said first relay is of the D.C. type for causing the relay to drop out and disable said utilization means responsive to any fault in the system causing said gate-controlled rectifier to be conductive during successive half-cycles of said input voltage.

5. The fire detector system set forth in claim 3 including a utilization circuit having therein contacts of both control relays whereby both control relays must be operated to enable said utilization circuit to be operated.

6. The fire detector system set forth in claim 5 including a normally open manual start switch serially connected in said utilization circuit, a work relay in said utilization circuit, and a normally open pair of contacts of said work relay closed by operation of the work relay and connected in parallel with said start switch to operate as a hold circuit for the work relay.

7. A fire detection system comprising a UV detector tube of a type capable of passing A.C. current when an A.C. voltage of a firing magnitude is applied thereto and the tube is subjected to ultraviolet radiation, a voltage step-up transformer having a secondary circuit including said UV tube for supplying a firing voltage from an A.C.

source of potential to said tube, a one-half wave rectifier in said secondary circuit for limiting operation of said tube to alternate half cycles of said A.C. source, a utilization circuit, a control circuit for said utilization circuit connected to said A.C. source and having therein an electronic switch with a control electrode connected to the primary circuit of said step-up transformer to render the switch conductive only during the half cycles when said UV tube is conductive, a D.C. relay and a full-wave rectifier in said control circuit in series with said electronic switch for causing an operating potential to be applied across said relay when said electronic switch is triggered during alternate half cycles of said A.C. source, a sensitivity control resistor for said relay in series with said electronic switch, a second D.C. relay connected across said electronic switch and sensitivity control resistor, said second relay requiring full-wave rectified current to hold the same operated, and switch contacts of said relays connected in said utilization circuit to render the utilization circuit operative only when both of said relays are operated.

References Cited

UNITED STATES PATENTS 3,189,743   6/1965   Johnson et al.

J. D. MILLER, Primary Examiner

W. J. SMITH, Assistant Examiner

U.S. Cl. X.R.

250—83.3; 317—130, 135, 148.5, 154